United States Patent [19]

Matsumoto et al.

[11] Patent Number: 4,953,835
[45] Date of Patent: * Sep. 4, 1990

[54] WIRE FOR COILED SPRING

[75] Inventors: Yukio Matsumoto; Horiyuki Saito; Kuniki Morita, all of Utsunomiya, Japan

[73] Assignee: Murata Hatsujo Co. Ltd., Tochigi, Japan

[*] Notice: The portion of the term of this patent subsequent to Apr. 5, 2005 has been disclaimed.

[21] Appl. No.: 378,678

[22] Filed: Jul. 12, 1989

Related U.S. Application Data

[60] Continuation of Ser. No. 177,269, Apr. 4, 1988, abandoned, which is a division of Ser. No. 9,041, Jan. 28, 1987, Pat. No. 4,735,903, which is a continuation of Ser. No. 638,602, Aug. 7, 1984, abandoned.

[30] Foreign Application Priority Data

Dec. 1, 1983 [JP] Japan .................. 58-225484

[51] Int. Cl.$^5$ ............................... F16F 1/06
[52] U.S. Cl. ..................... 267/180; 267/166
[58] Field of Search ............ 267/4, 286, 166, 167, 267/180, 174; 140/103, 2, 3 CA; 5/256; 29/173, 227

[56] References Cited

U.S. PATENT DOCUMENTS 2,998,242 8/1961 Schwarzbeck et al. ......... 267/166 X
4,735,403 4/1988 Matsumoto et al. ............ 267/180

FOREIGN PATENT DOCUMENTS 27-3261 8/1952 Japan .
0579473 11/1977 U.S.S.R. ................ 267/286

Primary Examiner—Douglas C. Butler
Attorney, Agent, or Firm—Armstrong, Nikaido, Marmelstein, Kubovcik & Murray

[57] ABSTRACT

Wire of an oval type cross sectional shape having a surface formed of a semicircle and semiellipse tangent to each other has been used for coiled springs. Stress distribution in wire of such a shape can be improved by increasing the dimension of the spring wire in a direction perpendicular to the axis of the spring. One such cross sectional shape is formed by semicircle and semiellipse portions connected by straight lines.

2 Claims, 5 Drawing Sheets

WIRE FOR COILED SPRING

This application is a continuation of Ser. No. 07/177,269 filed Apr. 4, 1988 now abandoned which was a division of Ser. No. 07/009,041 filed Jan. 28, 1987 now U.S. Pat. No. 4,735,403 which was a continuation of Ser. No. 06/638,602 filed Aug. 7, 1984 now abandoned.

BACKGROUND OF THE INVENTION

1. Field of the Invention

This invention relates to a coiled spring, and particularly to an improvement in a spring wire intended for use in making a coiled spring in which a wire is generally oval in section.

2. Description of the Prior Art

Ordinarily, a conventional coiled spring is made from a wire which is circular in section. However, there was a problem in that as is known, when an axial load acts on the coiled spring of circular section, a stress generated in the peripheral portion is large internally of the coil due to the curved coil wire and direct shearing force, and therefore, not only the energy efficiency is poor but cracks which lead to snapping are likely to occur.

The maximum stress $\tau_{max}$ is obtained by Wahl formula:

$$\tau_{max} = \frac{8DP}{\pi d^3}\left(\frac{4C-1}{4C-4} + \frac{0.615}{C}\right) \quad (1)$$

where C is the spring exponent, and C is given by $$C = D/d$$

D is the diameter of coil and d is the diameter of wire.

Japanese Patent Publication No. 3261/52 and U.S. Pat. No. 2,998,242 have been known which improve a disadvantage in that the maximum stress increases. In the former, the wire is oval in section, and in the latter, the shape is a combination of a semicircle and a semiellipse. The relation between the long diameter W and the short diameter t of the wire is determined by $$\frac{W}{t} = 1 + \frac{1.2}{C} \quad C = \frac{D}{W} \quad (2)$$

On the other hand, with the recent tendency of reducing the weight of automobiles, it has been required, in valve springs, torsion springs and the like of the engine, to design light-weight springs. This means that the length of a spring when the wire turns are in close (actual) contact, i.e. when the spring is compressed, called the solid height, is minimized and the weight absorbing a given amount of energy is minimized, that is, the energy efficiency is enhanced.

The length $H_s$, or solid height, of the spring is generally calculated by $$H_s = (N - 0.5)t \quad (3)$$

where N is the total number of turns of the coil, and t is the longitudinal dimension of wire.

That is, to reduce the said height, the total number of turns N is reduced and the longitudinal dimension of the wire is made small. To enhance the efficiency of energy, the stress in the peripheral portion is made uniform, and the maximum stress $\tau_{max}$ is lowered.

In the shape of a wire comprising a semicircle and a semiellipse as described above, the said height can be reduced by flattening a section of the wire. This meets the aforementioned requirement in respect of the fact that the maximum stress is lowered, to which attention is recently invited suddenly.

In the conventional material-dynamics solution, stress analysis of a suitable sectional shape is extremely difficult, and the shape of a wire is also considered to be relatively simple. However, lately, there is established an elastic-dynamics solution (Fourier development boundary value average method) in which a boundary in the outer peripheral portion in section is divided into a number of wire elements, Fourier development is made along each of the wire elements, which are expanded over the whole area of boundary, thus making it possible to perform stress analysis of a suitable shape.

As a consequence, it has become clear that the above-described known semicircular and semielliptical sectional shapes are not always sufficient in respect of evenness of stress and reduction in maximum stress

SUMMARY OF THE INVENTION

In accordance with the present invention, a sectional shape which can lower the maximum stress and make stress even as much as possible is found on the basis the above-described analysis to reduce the solid heights of a coiled spring and enhance the energy efficiency.

A known improved sectional shape of a wire is that a portion 1 is a semicircle and a portion 2 is a semiellipse as shown in FIG. 1. Thus, the following relation is obtained:

$$\frac{a}{b} = \frac{2W}{t} - 1 \quad (4)$$

where a is the long diameter of the ellipse forming the semiellipse portion, and b is the short diameter. The stress distribution is shown in FIG. 2, in which the inside of the coil is indicated at 0° and the outside of the coil indicated at 180°, and the maximum stress point is located at about 55 degrees as shown in the curve B as a function of an angle $\psi$ at the center of gravity G.

In accordance with the present invention, a so-called build-up is formed in the vicinity of the maximum stress point to lower the maximum stress.

DETAILED DESCRIPTION OF THE PREFERRED EMBODIMENTS

Figure 3:
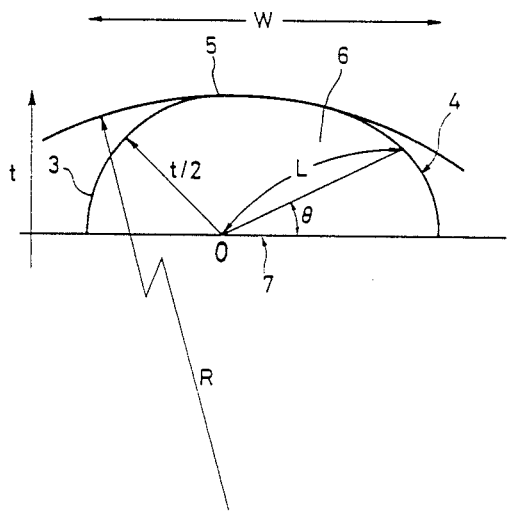
FIG. 3 is a half sectional view of one embodiment of a spring wire in accordance with this invention.

FIG. 3 is a sectional view of a wire showing one embodiment of a spring in accordance with the present invention. In the illustrated embodiment, there is shown a sectional shape comprising a semicircle 3, an ellipse 4 and a large circle 5 in contact therewith. The long diameter and short diameter of the wire are obtained from formula (2), then the radius R of the large circle 5 and the shape of the ellipse 4 are given by $$R = 3t \tag{5}$$

$$\frac{a}{b} = 1\left(\frac{2W}{t} - 1\right) \tag{6}$$

Figure 1:
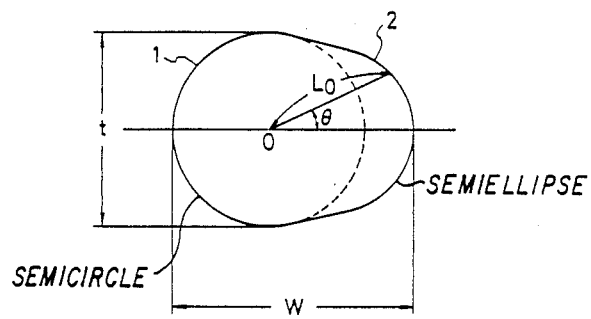
FIG. 1 is a sectional view of a known spring wire.
Figure 2:
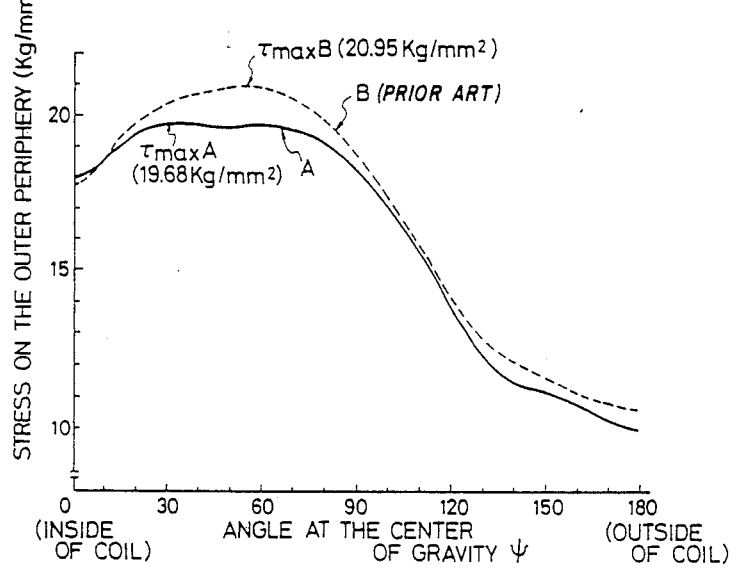
FIG. 2 shows the stress distribution.

In this shape, the length L from the center o of a semicircle with respect to the same coordinate $\theta$ is longer than $L_o$ of FIG. 1, i.e. $L_o < L$. The stress distribution is nearly even over $25°-75°$ as shown by the curve A in FIG. 2, and the maximum stress $\tau_{max}$ is also lowered.

Generally, since the life of a spring is determined by the maximum stress in the periphery in section, it is apparent that the spring of the present invention is capable of longer life than that of a semicircle and a semiellipse. If the maximum stress is made the same, the wire can be reduced in diameter to shorten the length of close contact of the spring and reduce the weight.

The following table shows a specific example by which the diameter of wire is reduced in the present invention, also showing a circular wire spring, and a semicircular and semielliptical wire spring.

| | Circle | Semicircle & semiellipse | Present invention |
|---|---|---|---|
| Conditions given | | | |
| Inner dia (mm) of coil | 15.6 | Same as left | Same as left |
| Spring constant (kg/mm) | 9.31 | | |
| Load (kg) | 100 | | |
| Maximum stress (kg/mm²) | 70 | | |
| Shape of spring | | | |
| Diameter of wire (mm) | φ4.65 | — | — |
| Long dia w × short dia t (mm) | — | 5.35 × 4.10 | 5.2 × 4.0 |
| Effective turn | 6 | 5.23 | 5.04 |
| Total turn | 8 | 7.23 | 7.04 |
| Length of close contact (mm) | 34.88 | 27.59 | 26.16 |
| Weight (gr) | 68.09 | 64.60 | 60.31 |
| For circular section | | | |
| Shortening percent of solid height | — | 21% | 25% |
| Reducing percent of weight | — | 5% | 11% |

In the Table, the shortening as a percentage of the length of close contact and the reduced percentage of weight shows the percentages with respect to a spring of circular section with the inner diameter of coil, spring constant and load being made constant and the maximum stress made the same. Considerable improvement is made by using a wire of the shape shown in FIG. 3 as compared with the semicircular and semielliptic shape shown in FIG. 1.

Figure 4:
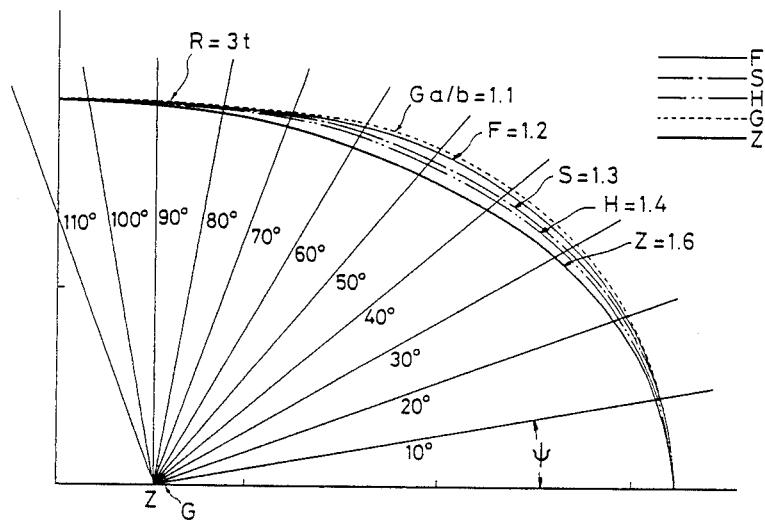
FIG. 4 is a sectional view of a further embodiment.
Figure 6:
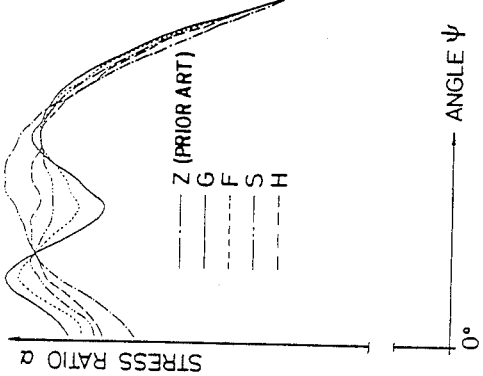
FIGS. 5 and 6 show the stress distribution thereof.
Figure 5:
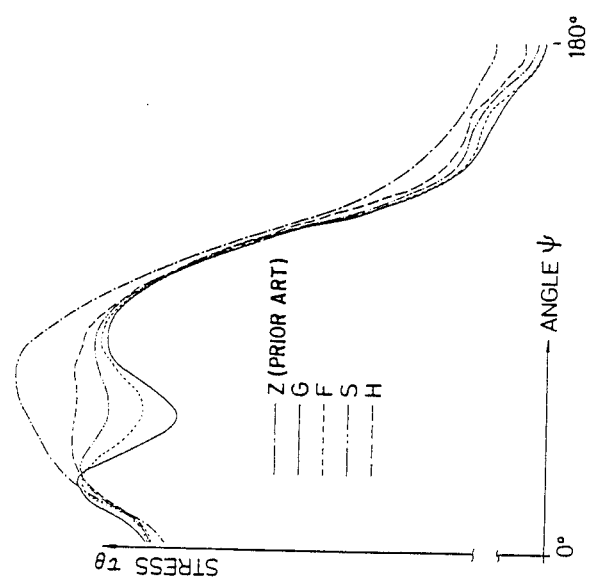

As previously described, in the present invention, the length L from the center of the semicircle to the semielliptical surface of a wire in FIG. 1 is made larger than the length $L_o$ in the case of a semicircle and a semiellipse of the prior art to thereby lower the maximum stress. In the example shown in the above-described table, the ratio a/b of long diameter to short diameter of the ellipse of the semicircular and semi-elliptic shape is 1.6 according to formula (4) and 1.4 according to formula (6) in the embodiment of the present invention. Where the a/b is 1.3, 1.2 and 1.1, an enlarged comparative view of the sectional shape is shown in FIG. 4 and the stress distribution shown in FIG. 5. As the a/b lowers, stress in the vicinity of 50° lowers, but the evenness is rather worsened. In FIGS. 4, 5 and 6 the curves G, F, S, H and Z represent, respectively, ratios a/b of 1.1, 1.2, 1.3, 1.4 and 1.6 as shown in FIG. 4.

On the other hand, as L becomes larger than $L_o$, the sectional area of a wire increases and the weight of the spring increases. FIG. 6 shows a stress ratio $\alpha$ as compared to a circular section of the same sectional area, that is, the case where it is standardized to the same sectional area. This means that when the a/b is about 1.1, the maximum stress reaches that of the same extent as that of the known semicircular and semielliptical shape, which fails to achieve the object of the present invention which is to lower the maximum stress.

Figure 7:
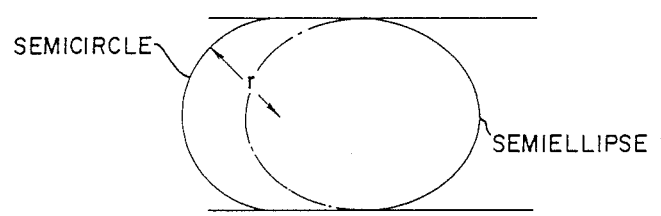
FIGS. 7 and 8 are respectively sectional views of other embodiments.

FIG. 7 shows the embodiment of the invention wherein the semicircle and semiellipse forming the wire shape are connected by straight lines. If the minor diameter of the semiellipse is the same as the diameter of the semicircle, as shown, the straight lines will be parallel. It will be apparent that this embodiment is merely a modification of that previously described wherein the large circle forming the connecting tangential portion is of infinite diameter.

Accordingly, in the present invention, the following range can be employed:

$$1.1 < a/b < \frac{2W}{t} - 1$$

Figure 8:
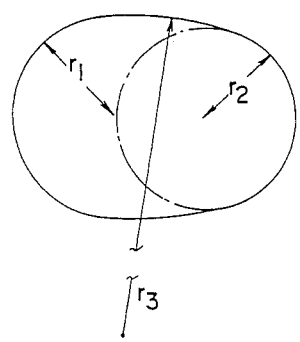

In this range, the shape of a wire is not only formed by a semicircle, a partial ellipse and a large circle in contact therewith as shown in FIG. 3 but formed by a combination of a semicircle, a semiellipse and a straight line tangent thereto as shown in FIG. 7. A semicircle, a circle having a smaller diameter than the semicircle and a large circle in contact therewith as shown in FIG. 8 also falls within the invention. In addition, by employment of a hollow wire, the weight reducing percent can be further increased.

Figure 9:
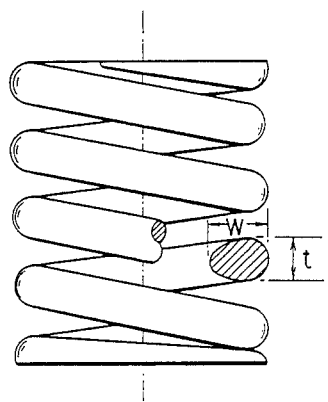
FIG. 9 shows a partial cut-away view of a coiled spring made from the spring wire of the invention, showing a section of the wire taken lengthwise of the coil.

Moreover, in each of the the sectional shapes as described above, the curvature along the curved outer surface of the wire as seen in a cross section of wire taken lengthwise of the coil as shown in FIG. 9 is smaller than that of a circular sectional shape, and therefore, for example, surface pressure generated when a partial coil of the spring is intentionally brought into contact in with an adjacent coil order to obtain a non-linear load characteristic, or surface pressure of a contact portion between a wound seat portion and an effective coil normally generated is reduced to advantageously lessen a the wear of said portion to provide a prolonged service life of the spring.

What is claimed is:

1. A spring wire, intended for use in making a coiled spring, in which a cross sectional shape of said wire has a surface that is semicircular at the outside of the coiled spring made therefrom and substantially semielliptical at the inside of said coiled spring, said wire having a sectional shape over the entire substantially semielliptical surface defined by a semielliptical portion and a straight line portion connecting said semielliptical portion and said semicircular surface, wherein the length (L) measured on a coordinate from the center of the semicircular surface (O) to the substantially semielliptical surface is greater than the corresponding dimension ($L_o$), taken on the same coordinate, of an ellipse expressed by $a/b = (2w)/t - 1$, where a is a long diameter and b the short diameter of the ellipse, t is the maximum dimension of said wire along a longitudinal axis of the coiled spring formed of said wire, and W is the maximum dimension of said wire at a right angle to said axis, such that the surface distribution of stress in coils of the spring made from said wire, when plotted at various angles (psi) taken about the center of gravity (G) of said wire, is made essentially uniform along a substantial portion of said plot, whereby low maximum surface stress is achieved for given dimensions t and W of said wire.

2. A spring wire as recited in claim 1 wherein the semiellipse of the semielliptical portion has a short diameter equal to the diameter of said semicircular surface.

* * * * *